(12) United States Patent
Pilcher et al.

(10) Patent No.: US 11,756,287 B2
(45) Date of Patent: *Sep. 12, 2023

(54) SYSTEMS AND METHODS FOR FEATURE EXTRACTION AND ARTIFICIAL DECISION EXPLAINABILITY

(71) Applicant: Raytheon Company, Waltham, MA (US)

(72) Inventors: Christopher M. Pilcher, Dallas, TX (US); Christopher Harris, Dallas, TX (US); John R. Goulding, McKinney, TX (US); William D. Weaver, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,485

(22) Filed: Jan. 10, 2022

(65) Prior Publication Data
US 2023/0244756 A1    Aug. 3, 2023

Related U.S. Application Data

(63) Continuation of application No. 16/887,508, filed on May 29, 2020, now Pat. No. 11,222,245.

(51) Int. Cl.
*G06V 10/40* (2022.01)
*G06F 18/241* (2023.01)

(52) U.S. Cl.
CPC ............ *G06F 18/241* (2023.01); *G06V 10/40* (2022.01); *G06V 2201/07* (2022.01)

(58) Field of Classification Search
CPC ............. G06K 9/6268; G06K 9/00771; G06K 9/4671; G06K 9/6267; G06K 9/46;
(Continued)

(56) References Cited

U.S. PATENT DOCUMENTS 5,123,057 A  *  6/1992  Verly ................. G06V 30/2504
                                                706/900
5,408,541 A  *  4/1995  Sewell ................... G01S 17/89
                                                356/3

(Continued)

FOREIGN PATENT DOCUMENTS

EP        2523016 A2    11/2012

OTHER PUBLICATIONS

Srinivas, U., "Discriminative Models for Robust Image Classification," Doctoral dissertation, Department of Electrical Engineering, The Pennsylvania State University (2013); online at ARXIV.org, Cornell University Library, 201 Olin Library, Cornell University, Ithaca, New York 14853, XP080688103, (Mar. 9, 2016).

*Primary Examiner* — Manav Seth
(74) *Attorney, Agent, or Firm* — Burns & Levinson, LLP; Joseph M. Maraia

(57) ABSTRACT

An automatic target recognizer system including: a database that stores target recognition data including multiple reference features associated with each of multiple reference targets; a pre-selector that selects a portion of the target recognition data based on a reference gating feature of the multiple reference features; a preprocessor that processes an image received from an image acquisition system which is associated with an acquired target and determines an acquired gating feature of the acquired target; a feature extractor and processor that discriminates the acquired gating feature with the reference gating feature and, if there is a match, extracts multiple segments of the image and detects the presence, absence, probability or likelihood of one of multiple features of each of the multiple reference targets; a classifier that generates a classification decision report based on a determined classification of the acquired target; and a user interface that displays the classification decision report.

20 Claims, 17 Drawing Sheets

(58) Field of Classification Search
CPC ........... G06K 9/00201; G06K 9/00369; G06K 9/6232; G06K 9/00671; G06K 9/00288; G06K 9/3233; G06K 9/6228; G06K 2209/21; G06K 2209/23; G06K 9/00228; G06K 9/00577; G06K 9/00744; G06K 9/626; G06V 10/40; G06V 2201/07; G06N 20/00; G06N 5/047; G06N 5/003; G06T 7/60; G06T 7/001; G06F 16/35; G06F 16/538; G06F 16/906; G06F 18/241
See application file for complete search history.

(56) References Cited

U.S. PATENT DOCUMENTS

| | | | | |
|---|---|---|---|---|
| 5,754,694 A * | 5/1998 | Villalba | | G06K 9/6282 382/226 |
| 5,963,653 A * | 10/1999 | McNary | | G01S 13/867 342/64 |
| 5,982,934 A * | 11/1999 | Villalba | | G06K 9/6282 382/226 |
| 6,263,088 B1 * | 7/2001 | Crabtree | | G08B 13/19602 382/104 |
| 6,653,970 B1 * | 11/2003 | Mitra | | G01S 13/003 342/191 |
| 6,724,931 B1 * | 4/2004 | Hsu | | G06K 9/6253 707/999.102 |
| 6,727,841 B1 * | 4/2004 | Mitra | | G01S 13/003 342/357.29 |
| 6,894,639 B1 * | 5/2005 | Katz | | G06K 9/6247 706/15 |
| 6,965,342 B2 * | 11/2005 | Klausing | | G01S 13/935 342/25 R |
| 7,330,565 B1 * | 2/2008 | Der | | G06V 10/255 356/3 |
| 7,376,262 B2 * | 5/2008 | Hu | | G06K 9/6293 382/156 |
| 7,496,228 B2 * | 2/2009 | Landwehr | | G06V 10/46 382/165 |
| 7,533,076 B2 * | 5/2009 | Harris | | G06K 9/6269 706/45 |
| 7,545,307 B2 * | 6/2009 | Shu | | G01S 7/412 342/25 R |
| 7,761,391 B2 * | 7/2010 | Schmidtler | | G06N 20/10 706/45 |
| 7,916,068 B2 * | 3/2011 | Wicks | | G01S 13/5248 342/162 |
| 7,928,896 B2 * | 4/2011 | Jin | | G01S 13/904 342/73 |
| 8,249,301 B2 * | 8/2012 | Brown | | G06V 10/235 382/104 |
| 8,369,572 B2 * | 2/2013 | Stanfill | | G06V 10/255 348/169 |
| 8,369,622 B1 * | 2/2013 | Hsu | | G06K 9/629 382/181 |
| 8,463,044 B2 * | 6/2013 | Meng | | G06V 10/50 382/190 |
| 8,713,003 B2 * | 4/2014 | Fotev | | G06F 16/3331 707/723 |
| 8,774,532 B2 * | 7/2014 | Brown | | G06V 10/255 382/103 |
| 9,081,800 B2 * | 7/2015 | Lin | | G06F 16/5854 |
| 9,158,970 B2 * | 10/2015 | Zhang | | G06V 40/172 |
| 9,760,834 B2 * | 9/2017 | Chae | | G16B 40/30 |
| 9,922,242 B2 * | 3/2018 | Eineren | | A01J 5/0175 |
| 10,054,445 B2 * | 8/2018 | Ma | | G06V 20/13 |
| 10,546,195 B2 * | 1/2020 | Lo | | G06V 20/188 |
| 10,605,606 B2 * | 3/2020 | Ma | | G06V 20/17 |
| 10,748,294 B2 * | 8/2020 | Ju | | G06V 20/00 |
| 10,753,708 B2 * | 8/2020 | Naftel | | G06V 10/17 |
| 10,839,528 B2 * | 11/2020 | Ross | | G06V 10/10 |
| 11,222,245 B2 * | 1/2022 | Pilcher | | G06V 10/40 |
| 2002/0159641 A1 | 10/2002 | Whitney | | G06K 9/6228 382/219 |
| 2005/0271248 A1 * | 12/2005 | Teku | | F41G 7/36 250/203.6 |
| 2006/0110029 A1 * | 5/2006 | Kazui | | G06V 40/161 382/190 |
| 2008/0012751 A1 * | 1/2008 | Owens | | G05D 1/12 342/25 R |
| 2010/0100835 A1 * | 4/2010 | Klaric | | G06V 20/13 715/810 |
| 2010/0226578 A1 * | 9/2010 | Kokojima | | G06V 10/446 382/195 |
| 2015/0286857 A1 * | 10/2015 | Kim | | G06K 9/6255 382/118 |
| 2016/0363653 A1 | 12/2016 | Zhang | | G06V 20/13 |
| 2018/0328736 A1 * | 11/2018 | Ma | | G06K 9/6269 |
| 2019/0011922 A1 * | 1/2019 | Feng | | G06V 10/751 |
| 2019/0206065 A1 * | 7/2019 | Ju | | G06V 10/25 |
| 2021/0063565 A1 * | 3/2021 | Sharma | | G01S 7/417 |

* cited by examiner

750

Ship Database Entry target_descriptors.target_type = 'Cement Trader';
target_descriptors.target_desc = 'Bulk Cargo';
target_descriptors.target_country = 'Civilian';
target_descriptors.target_length_m = 106.000000;
% 1=feature_name, 2=sub_feature_identifier, 3=center_from_bow_m, 4=len_m,
5=center_from_bow_percent, 6=len_percent, 7=start_cell, 8=stop cell
target_descriptors.features = {'Forecastle Short', 'X', 9.697665, 19.005711,
0.091487, 0.179299, 780.010638, 657.644681;
    'Funnel', 'X', 96.185681, 4.330415, 0.907412, 0.040853, 148.044681,
175.925532;
    'Mast', 'X', 11.802728, 2.044918, 0.111346, 0.019292, 698.691489,
711.857447;
    'Mast', 'X', 87.103838, 3.728969, 0.821734, 0.035179, 208.453191,
232.461702;
    'Super Structure Medium', 'X', 93.479171, 25.621624, 0.881879, 0.241713,
96.929787, 261.891489;
    'Jib Crane Short', 'X', 60.459755, 28.388278, 0.570375, 0.267814,
483.389362, 300.614894;
    'Cargo Deck Shipping Crate', 'X', 22.989634, 7.337648, 0.216883,
0.069223, 609.627660, 656.870213;
    'Cargo Deck Shipping Crate', 'X', 33.695383, 6.856491, 0.317881,
0.064684, 542.248936, 586.393617;
    'Cargo Deck Shipping Crate', 'X', 48.130100, 11.908642, 0.454058,
0.112346, 433.048936, 509.721277;
    'Cargo Deck Shipping Crate', 'X', 66.053208, 9.262277, 0.623143,
0.087380, 326.172340, 385.806383};
target_descriptors.model_image_file_path =
'C:\data\target_0001_azimuth_90.jpg';
target_descriptors.bow_pos_cells = 781.264894;
target_descriptors.stern_pos_cells = 98.796809;

FIG. 7B

Excerpt from 150 ship database for decision tree ship classifier

Ship Under Test (Maestrale1) Compared to FFG

| Name | Length | Bow Gun | Stern Helipad | Stern Super Structure | x4 | x5 | Class |
|---|---|---|---|---|---|---|---|
| Maestrale 1 | 123 | | | | SS | SS | FFG |
| Maestrale 2 | 123 | | | | SS | M | FFG |
| Exeter 1 | 125 | | | | SS | SS | FFG |
| Exeter 2 | 125 | | | | SS | M | FFG |
| Godavari 1 | 126 | | | | SS | SS | FFG |
| Godavari 2 | 126 | | | | SS | M | FFG |
| Amazon 1 | 117 | | | | SS | SS | FFG |
| Amazon 2 | 117 | | | | SS | M | FFG |
| Amazon 3 | 117 | | | | SS | SS | FFG |
| Amazon 4 | 117 | | | | SS | M | FFG |
| Bremen 1 | 130 | | | | SS | M | FFG |
| Bremen 2 | 130 | | | | SS | M | FFG |
| Bremen 3 | 130 | | | | SS | M | FFG |
| Bremen 4 | 130 | | | | SS | M | FFG |

FIG. 12

| | | | | | | |
|---|---|---|---|---|---|---|
| Heemskerck 1 | 130 | 0 | 0 | | M | SS | FFG |
| Heemskerck 2 | 130 | 0 | 0 | | M | SS | FFG |
| Heemskerck 3 | 130 | 0 | 0 | | M | SS | FFG |
| Heemskerck 4 | 130 | 0 | 0 | | M | SS | FFG |
| Kortenaer 1 | 130 | | | | M | SS | FFG |
| Kortenaer 2 | 130 | | | | M | SS | FFG |
| Van Galen 1 | 114 | | | 1 | SS | SS | FFG |
| Van Galen 2 | 114 | | | 1 | SS | M | FFG |
| Van Galen 3 | 114 | | | 1 | SS | SS | FFG |
| Van Galen 4 | 114 | | 0 | 1 | M | M | FFG |
| Luda | 132 | | | 1 | M | SS | FFG |
| Lupo 1 | 113 | | | 1 | SS | SS | FFG |
| Lupo 2 | 113 | | | 1 | SS | M | FFG |
| Lupo 3 | 113 | | | 1 | SS | SS | FFG |
| Lupo 4 | 113 | | | 1 | SS | M | FFG |

FIG. 12 (cont.)

SYSTEMS AND METHODS FOR FEATURE EXTRACTION AND ARTIFICIAL DECISION EXPLAINABILITY

TECHNICAL FIELD

This application relates generally to automatic target recognition and, more particularly, to automatic target recognition with concise feature extraction and explainability.

BACKGROUND

An automatic target recognizer (ATR) is a real-time or near-real-time image or signal processing system. An ATR typically receives an input stream of data and outputs a list of targets that it has detected and recognized from the input stream of data. An ATR system can perform other functions such as image stabilization, preprocessing, mosaicking, target tracking, activity recognition, multi-sensor fusion, common operating picture, sensor and platform control, and data organizing for transmission or display. ATR input data can be in the form of non-imaging one-dimensional (1D) sensor returns, e.g., ultra-high range-resolution (HRR) radar returns for air-to-air automatic target recognition or vibration signatures from a laser radar for recognition of ground targets. ATR data can have two-dimensional (2D) images that fall into three general views: perspective, plan and profile. Typical 2D images are infrared and synthetic aperture radar (SAR) images. ATR input data can be three-dimensional (3D), such as those from sequences of multiple exposures taken over time from a nonstationary position. As a target moves, so do sensors, and that movement can be exploited by an ATR. Hyperspectral data, which are views of the same scene looking at in different spectral bands, is another approach to obtaining multiple image data where the third dimension is wavelength.

The real world covers many factors of variation (FoV), drawn from the physics of sensed observations. For problems like discrimination, the state of the world relative to its FoV is estimated, for example but not limited to where something is (i.e., position in the world and range from the sensor), what something is (i.e., general class, specific object kind), kinematic state (e.g., velocity, acceleration, jerk), and pose (i.e., orientation with respect to our observation frame). Sensors observe the world, but couple across many of the FoV. The state is estimated using data from the one or more sensors, which observe across many more FoV than just the ones we are interested in, and compress/correlate across other FoV. When the statistics of some FoV of interest may be understood, the preferred method is to regress on the parameters of that model to solve the state. The covariation between the FoV and the sensed state of the world forms a manifold. Each sensor modality and characteristic may induce a different manifold, on the same underlying FoV. Non-linear projections reduce dimensionality, but mapping is key to learning a compact representation that generalizes well. Linear projections produce complex, high-dimensional manifolds that require exponentially many parameters. The process of covering the world state manifold is very much like splining. An unknown function is approximated with a parametric function whose parameters are fit via an error minimization process. The goal is to find some parametric model which can estimate the statistics of the underlying problem effectively. Products of log linear models do a highly effective job of fitting a wide array of real-world distributions, as they are an intrinsic parametric form of discrete state systems. The Log linear model, for example $$f(x) \sim e^{(\Sigma_i \theta_i \phi_i(x))}$$

Where x is a vector which represents a configuration of the system (e.g., an image chip from a sensor), $\phi_i(x)$ is a function of the values of the vector x, and $\phi_i$ is a parameter of the model. The Boltzmann Distribution from physics maps from phase space (FoV space) to observable space, and it may be used for sensor data to FoV space.

Modern ATR systems typically process data in four stages. The first stage is a selection of the sensors used to produce target measurements. The second stage involves preprocessing of the data and regions of interest within the data, which is referred to as segmentation. The third stage includes feature extraction and selection where the regions of interest of the data are characterized. The last stage involves processing of features for decision making (i.e., classification). Classification techniques can utilize artificial intelligence (AI), neural networks, Bayesian networks, fuzzy logic, normalized linear correlation, and feature sequencing to enhance classification, to name but a few.

While the use of AI, neural networks, and deep learning have increased the accuracy and reliability of ATR systems, such processing is often so complex that it is impractical for human operators to understand how an ATR reached target decisions. For certain organizations, it can be critically important for operators to have the ability to understand and explain their rational for taking actions associated with an ATR, including explaining how targets were identified by an ATR system under their control. Furthermore, the processing complexity associated with typical classification models and associated data sets often requires a relatively long model training period which can be unacceptable in certain circumstances such as military engagements or missions.

SUMMARY

The application, in various implementations, addresses deficiencies associated with the efficiency and decision explainability for automatic target recognition.

This application describes an exemplary automatic target recognizer (ATR) configured to realize target decisions that are more readily understandable and explainable while also reducing classifier model training time and increasing classification accuracy. In some implementations, an ATR system knows the characteristics or features of the ships or vessels in its mission dependent database. The ATR system extracts features from inverse synthetic aperture radar (ISAR) images based on, for example, a more fundamental gating feature such as Length overall (LOA) of the vessel. Length overall is the maximum length of a vessel's hull measured parallel to the waterline. While LOA may serve as a primary discriminator, it alone is often insufficient to determine Fine Naval Class or ship Type, for example, when two or more ships of similar LOA are present in a Surface Action Group (SAG). Along the length of the vessel, the ATR system then looks for and discriminates guns, turrets, masts, kingposts, cranes, funnels, super structure, radar flash, or heli-pads, to name but a few. Many cruisers, frigates, and destroyers have guns, superstructure, empty deck, and heli-pads or turrets in particular locations.

The ATR systems and methods described herein may use an algorithm or function that excises and/or extracts portions of the ISAR image into multiple segments and then refocuses an image associated with each segment to, thereby, enhance each segment so that features can be detected. Locations of the detected features along the length (e.g., profile view) or width (e.g., plan view) or combination of length and width (e.g. perspective view) of the ship and/or vessel may be included as part of an explanation of the machine learning decision regarding a determined ship class of the vessel in the acquired image. Some classes may be excluded because of track kinematics (e.g., position, velocity or heading) or area of operation of the vessel, i.e., a location of the vessel such as the Black Sea. The ATR system may generate a classification decision report that uses the presence or absence of features in each segment (e.g., deciles along the LOA) to create a simple, contrastive, and graphical explanation of a classification decision. Features may be fused in a straightforward Bayesian manner to provide confidence metrics for the classification decision.

By initially reducing the set of possible classes based on a fundamental gating feature, the systems and methods herein provide a technically advantageous ATR system capable of providing a more readily understandable and/or explainable decision report to a human operator. For example, the smaller the number of possible classes, the more likely that a decision process and/or decision tree is relatively shallow, i.e., has less decision branches, and, therefore is more readily presentable and perceivable by a human operator. The initial reduction in possible classes may also advantageously enhance ATR system decision accuracy by potentially reducing the number of features that must be analyzed to reach a classification decision. Furthermore, by reducing the number of possible classes initially, an ATR classifier model can be more rapidly trained, allowing an ATR system such as described herein to become mission ready sooner than conventional ATR systems. In certain instances, the inventive ATR systems described herein are able to more efficiently classify targets without needing access to specific target vessel information which also enables more rapid processing and model training based on substantially less data.

In one aspect, an automatic target recognizer system includes a database arranged to store target recognition data including a plurality of reference features associated with each of a plurality of reference targets. The system also includes a pre-selector arranged to select a portion of the target recognition data based on a reference first gating feature of the plurality of reference features. The system includes a preprocessor arranged to process a first image received from an image acquisition system where the first image is associated with an acquired first target and determine an acquired first gating feature of the acquired first target. The system also includes a feature extractor and processor, in electrical communication with the database, pre-selector, and pre-processor that is arranged to: i) discriminate the acquired first gating feature with the reference first gating feature and, if there is a match, extract a plurality of segments of the first image, and ii) detect one of the presence, absence, probability or likelihood of one of the plurality of features associated with each of the plurality of reference targets. The system includes a classifier, in electrical communication with the database, pre-selector, preprocessor, and feature extractor and processor, that is arranged to: i) create a plurality of classification problems associated with the portion of the target recognition data based on the reference first gating feature, ii) create a plurality of decision trees that solve the plurality of classification problems, iii) select the decision tree having the minimal misclassification cost, iv) determine a classification of the acquired first target based on the decision tree having the minimal misclassification cost, and v) generate a classification decision report based on the determined classification of the acquired first target. The system further includes a user interface that is arranged to display the classification decision report.

The first gating feature may include target length overall, target state, target kinematics, target location, or mission context. The reference first gating feature may include lengths overall of one or more reference vessels and the acquired first gating feature may include a length overall of an acquired vessel, where the preprocessor determines the length of the acquired vessel by processing the first image. The feature extractor and processor may determine that a match has occurred when a difference in the length overall of the acquired vessel and the lengths of the one or more reference vessels are less than or equal to a pre-determined percentage difference. The feature extractor and processor may discriminate the plurality of segments associated with the acquired vessel with a plurality of sections of the one or more reference vessels. The plurality of sections may include one of a discrete number of pre-determined sections.

The feature extractor and processor may enhance an image associated with each of the extracted segments of the first image. The first image may be generated based on synthetic aperture radar (SAR), inverse synthetic aperture radar (ISAR), laser detection and ranging (LADAR), infrared detection, optical based imagery, and/or hyperspectral radar data. The classification decision report may include a graphical explanation of the determined classification of the acquired first target. The classification report may include a graphical representation of the decision tree having the minimal misclassification cost.

The classifier may fuse a portion of the reference features of the plurality of reference features to provide confidence metrics associated with the determined classification of the acquired first target. The pre-selector may be arranged to select the portion of the target recognition data based further on a reference second gating feature of the plurality of reference features. The feature extractor and processor may further compare an acquired second gating feature with the reference second gating feature and the classifier may create the plurality of classification problems based further on the acquired second gating feature.

In another aspect, an automatic target recognizer server includes a communications interface arranged to: i) receive first image data associated with a first image from an image acquisition system and ii) arranged to receive, from a database, target recognition data including a plurality of reference features associated with each of a plurality of reference targets. The server also includes a pre-selector arranged to select a portion of the target recognition data based on a reference first gating feature of the plurality of reference features. The server includes a preprocessor arranged to process a first image received from an image acquisition system where the first image is associated with an acquired first target and determines an acquired first gating feature of the acquired first target. The server includes a feature extractor and processor arranged to: i) discriminate the acquired first gating feature with the reference first gating feature and, if there is a match, extract a plurality of segments of the first image, and ii) detect one of the presence, absence, probability or likelihood of one of the plurality of features associated with each of the plurality of reference targets. The server includes a classifier arranged to: i) create a plurality of classification problems associated with the portion of the target recognition data based on the reference first gating feature, ii) create a plurality of decision trees that solve the plurality of classification problems, iii) select the decision tree having the minimal misclassification cost, iv) determine a classification of the acquired first target based on the decision tree having the minimal misclassification cost, and v) generate a classification decision report based on the determined classification of the acquired first target. The server further includes a user interface arranged to display the classification decision report.

In a further aspect, a method of performing automatic target recognition includes: storing, in a database, target recognition data including a plurality of reference features associated with each of a plurality of reference targets; selecting a portion of the target recognition data based on a reference first gating feature of the plurality of reference features; processing a first image received from an image acquisition system, wherein the first image is associated with an acquired first target; determining an acquired first gating feature of the acquired first target; discriminating the acquired first gating feature with the reference first gating feature and, if there is a match, i) extracting a plurality of segments of the first image, and ii) detecting one of the presence, and absence, probability or likelihood of one of the plurality of features associated with each of the plurality of reference targets; generating a plurality of classification problems associated with the portion of the target recognition data based on the reference first gating feature; generating a plurality of decision trees that solve the plurality of classification problems; selecting a decision tree having the minimal misclassification cost; determining a classification of the acquired first target based on the decision tree having the minimal misclassification cost; and generating a classification decision report based on the determined classification of the acquired first target.

Any two or more of the features described in this specification, including in this summary section, may be combined to form implementations not specifically described in this specification. Furthermore, while this specification may refer to examples of systems and methods related to ships and water-based vessels, the implementations and methods herein equally apply to land, air, and space based vehicles or systems such as, without limitation, cars, trucks, tanks, aircraft, blimps, missiles, rockets, spacecraft, satellites, and drones.

The details of one or more implementations are set forth in the accompanying drawings and the following description. Other features and advantages will be apparent from the description and drawings, and from the claims.

DESCRIPTION OF THE DRAWINGS

FIG. 7B illustrates data in the exemplary database of FIG. 7A being stored in text format;

FIG. 12 shows an exemplary database comparing multiple target contacts with reference features associated with a reference Frigate ("FFG") Gross Naval Class.

Like reference numerals in different figures indicate like elements.

DETAILED DESCRIPTION

The application, in various aspects, addresses deficiencies associated with conventional automatic target recognizers. The application includes exemplary apparatuses, systems and methods for an ATR system configured to realize target decisions that are more readily understandable and explainable while also reducing classifier model training time and increasing classification accuracy. In one implementation, an inventive ATR system knows the characteristics or features of ships or vessels in its mission dependent database and extracts features from inverse synthetic aperture radar (ISAR) images based on, for example, a fundamental gating feature such as length of a vessel. By initially reducing a set of possible classes based on the fundamental gating feature, the systems and methods herein provide a technically advantageous ATR system capable of providing a more readily understandable and/or explainable decision report to a human operator.

Figure 1:
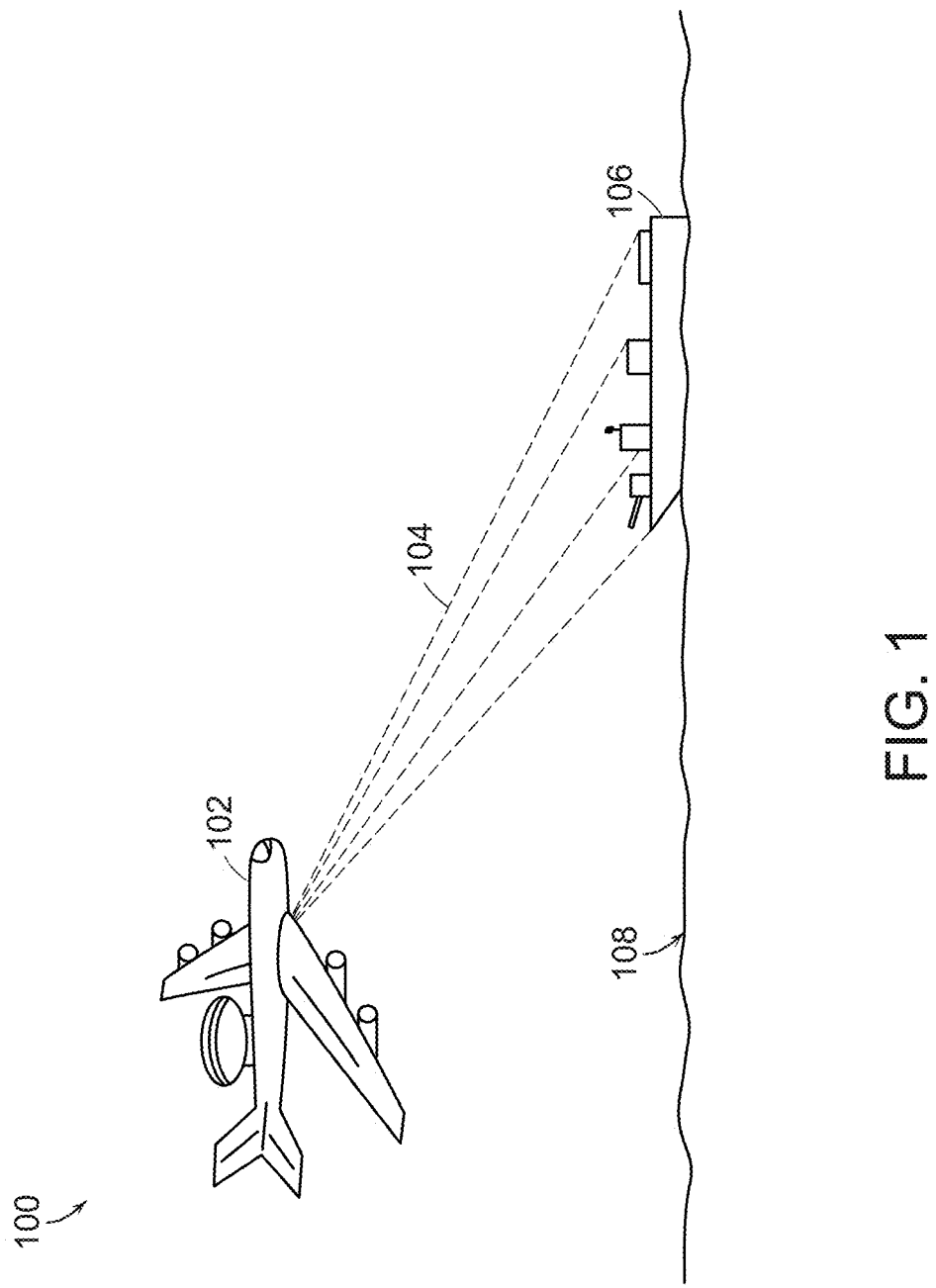
FIG. 1 is an illustration of an aircraft using an inverse synthetic aperture radar (ISAR) system to capture image data associated with a target naval vessel.

FIG. 1 is a view 100 of an aircraft 102 using a radar system to capture image data associated with a target naval vessel 106. The view 100 shows aircraft 102 emitting radar beams 104 from an antenna to illuminate the vessel 106, which enables aircraft 102 to capture radar pulses echoed back toward the aircraft 102 as it moves through the air. As the antenna location changes with respect to time, a radar system in aircraft 102, which may be a synthetic aperture radar (SAR) or inverse synthetic aperture radar (ISAR), combines recordings at multiple positions of the aircraft 102 and its antenna to form a synthetic antenna aperture. This allows the radar system to generate high-resolution images and/or data of the target vessel 106 using a relatively small antenna.

Aircraft 102 may have an ATR system that receives raw target data and/or target images from a radar system of aircraft 102. The aircraft 102 may have an image acquisition system that receives data from a radar receiver, processes the data into images, and provides the images of vessel 106 to the ATR. The aircraft 102 may send its raw or processed target and/or image data to other land, sea, or air entities. For example, aircraft 102 may be communicatively linked with other aircrafts, vessels, and facilities via, for example, an Aegis Combat System that enables aircraft 102 to transmit target data and/or images to a remote ATR system at another entity connected to the Aegis network. The aircraft 102 may also operate bi-statically to receive radar pulses from another aircraft or ground transmitter.

Figure 2:
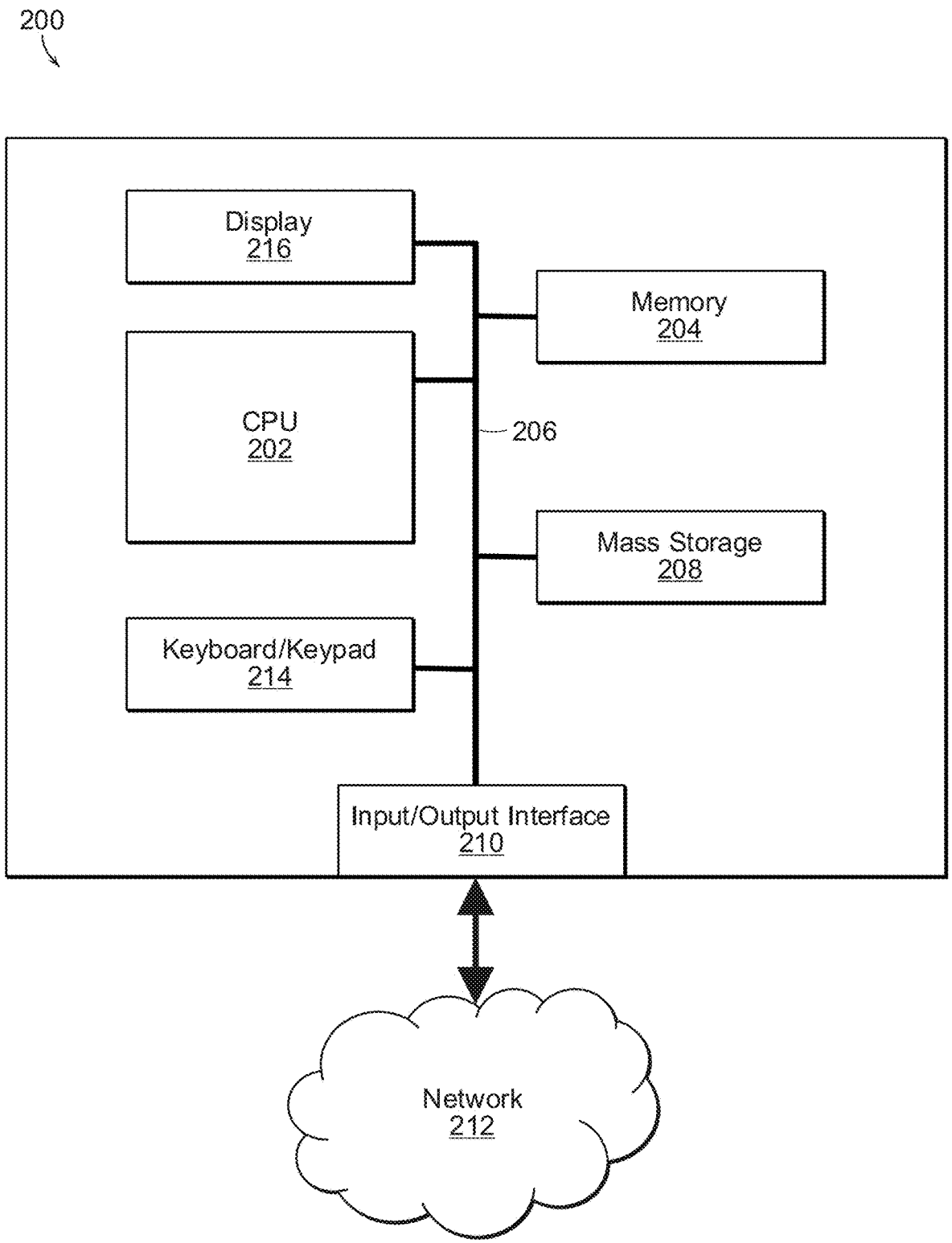
FIG. 2 is block diagram of a computer system arranged to perform processing associated with an ATR system.

FIG. 2 includes a block diagram of a computer system 200 for performing the functions of a computer for an ATR system such as, for example, server 302, which is discussed in detail later herein. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, tape drives, etc. The memory 204 also includes dynamic random access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202.

The mass storage 208 may include one or more magnetic disk or tape drives or optical disk drives or solid state memories, for storing data and instructions for use by the CPU 202. At least one component of the mass storage system 208, preferably in the form of a non-volatile disk drive, solid state, or tape drive, stores the database used for processing image data and/or running artificial intelligence (AI) engines and neural networks of an ATR system. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card or any other suitable data communications device. To provide the functions of a computer 102 according to FIG. 1, the data interface 210 may provide a relatively high-speed link to a network 212, such as an intranet, internet, Aegis network, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system 200 to perform remote or distributed multi-sensor processing, to for a COP. Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database of mass storage system 208. One or more such applications may include an image acquisition system and/or an ATR such as described with respect to FIGS. 3, 8, and 9.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as data extraction, processing, and/or target classification using neural networks. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with the system 300 and/or 800, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 300 and/or 800 includes a networked-based, e.g., Internet-based, application that may be configured and run on the system 200 and/or any combination of the other components of the system 300 and/or 800. The server 302 and/or computer system 200 may include a web server running a Web 2.0 application or the like. Web applications running on systems 300 and/or 800 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain implementations, system 300, 200 and/or 800 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 300, server 302, computer 200, system 800, or another component of systems 300 and 800 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Figure 3:
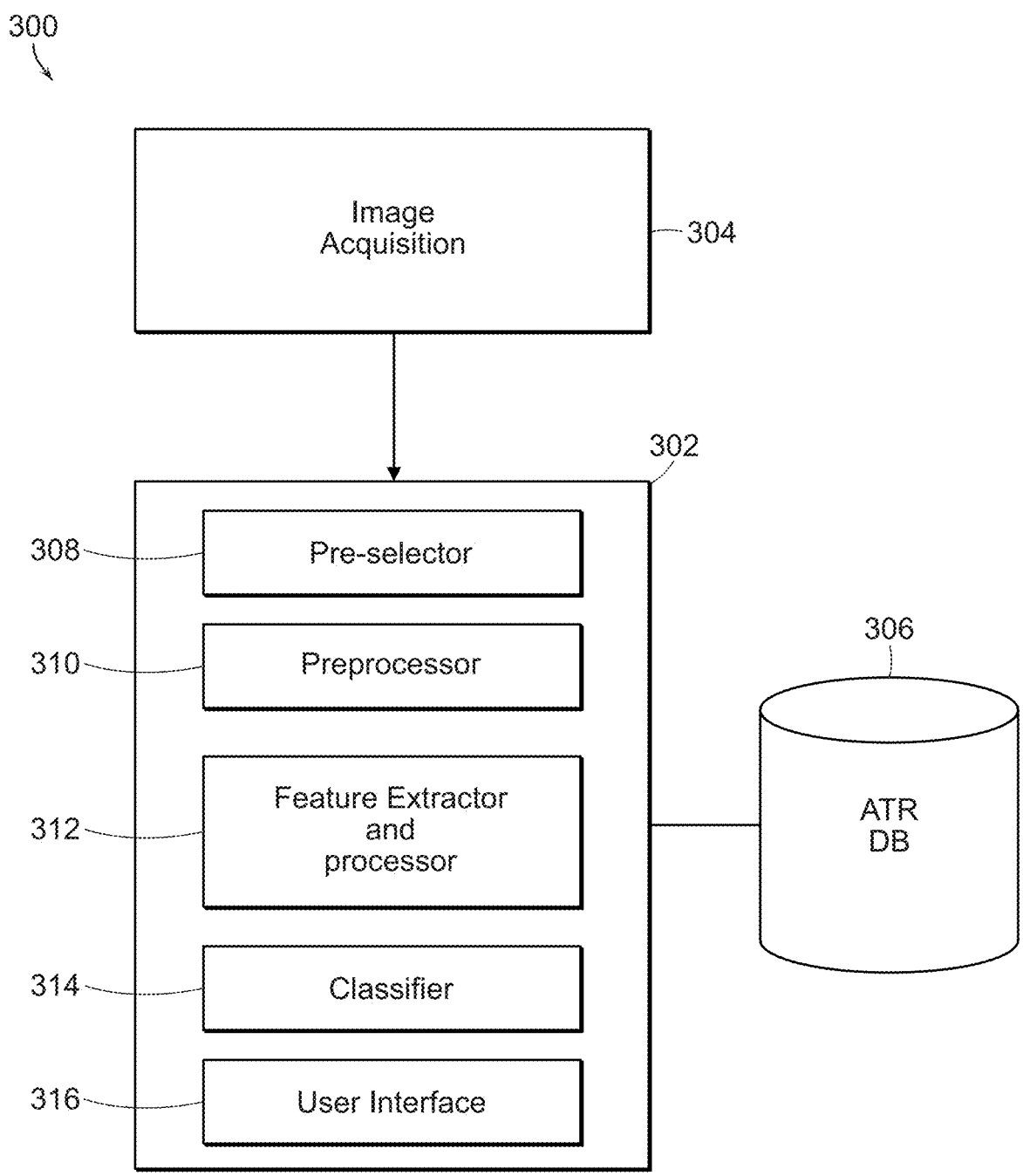
FIG. 3 is a block diagram of an ATR including a pre-selector.

FIG. 3 is a block diagram of an ATR system 300 including an image acquisition unit 304, and ATR server 302, a pre-selector 308, a preprocessor 310, feature extractor and processor 312, a classifier 314, a user interface 316, and an ATR database 306. Image acquisition unit 304 may interface with and/or include a radar transceiver used to emit radar pulses and/or receive echoes from an illuminated target or terrain. Image acquisition unit 304 may use any of various spectrum estimation techniques to create image data associated with a target. Unit 304 may use fast Fourier transform imaging techniques including periodogram or matched filters, a Capon method, APES method, SAMV method, parametric subspace decomposition methods, MUSIC method, Overlapped Sub Aperture (OSA), autofocus, time-domain backprojection, and/or frequency-domain backprojection among other known techniques.

Image acquisition unit 304 may use variation reduction techniques depending on whether a SAR or ISAR is used to acquire target data. Unit 304 may use techniques such as image energy normalization and/or pose rectification in RF signal processing and image formation. Unit 304 may apply a polar mapping method for ISAR images. Image acquisition unit 304 may use various techniques to process raw radar target data to form a human perceivable image of an illuminated target such as vessel 106. Alternatively, image acquisition unit 304 may process received radar data into a non-perceivable form that is then further processed by, for example, preprocessor 310 to realize a human perceivable image such as, for example, image 400 of FIG. 4. Image 400 is an ISAR image. Image acquisition unit 304 may process images and/or image data based on, without limitation, synthetic aperture radar (SAR), inverse synthetic aperture radar (ISAR), laser detection and ranging (LADAR), infrared detection, EO/IR (optical based imagery), and/or hyperspectral radar data.

Preprocessor 310 may perform some or all of the operations described with respect to image acquisition unit 304. Preprocessor 310 may perform additional processor techniques to further enhance an image such as image 400. Preprocessor 310 may analyze image 400 to determine one or more features of the vessel depicted in image 400. In some implementations, preprocessor 310 estimates the length of the vessel in image 400 based on measured characteristics of image 400. As illustrated in image 500 of FIG. 5, which is image 400 with overlay indicators, preprocessor 310 identifies the bow 502 and stern 504 of the vessel and estimates an apparent length 506 of the vessel and the aspect angle of the image. In other implementations where the target vessel has been tracked, preprocessor 310 may compute the aspect angle from track information and ownship information using conventional methods that are well known. The aspect angle information combined with the apparent length information gleaned from the image may be used to compute a true length. Based on the apparent length and aspect angle, preprocessor 310 calculates a true length of the vessel. For example, if the apparent length is 86 meters and the aspect angle is 55 degrees, then the calculated true length of the vessel is 150 meters. Preprocessor 310 may estimate any one or more characteristics of the vessel of FIGS. 4 and 5 such as, without limitation, length, height, width, shape, and kinematics. Preprocessor 310 may perform one or more quality checks of image 400 to determine if the image is of sufficient quality to perform a target recognition analysis.

Pre-selector 308 may designate a vessel characteristic determined by preprocessor 310 as an acquired gating feature that determines how further processing of image 400 is performed by ATR system 300. Pre-selector 308 may receive a designation of an acquired gating feature from an operator via user interface 316, determine an acquired gating feature based on location data from a location sensor such as a GPS receiver, and/or determine an acquired gating feature based on mission context data stored in ATR database 306. In certain implementations, pre-selector 308 selects a portion or subset of target recognition data in database 306 based on a reference gating feature associated with multiple reference features stored in database 306. The reference gating feature may include a fundamental characteristic of a class of target such as, without limitation, target LOA, target width, target height, target state, target kinematics, target shape, target location, and/or mission context. Target state refers to intrinsically sensed characteristics, such as maneuvering, the presence or absence of fuel barrels, torpedoes, articulation of gantry cranes, jib masts, guns, and open or closed hatches.

Figure 7A:
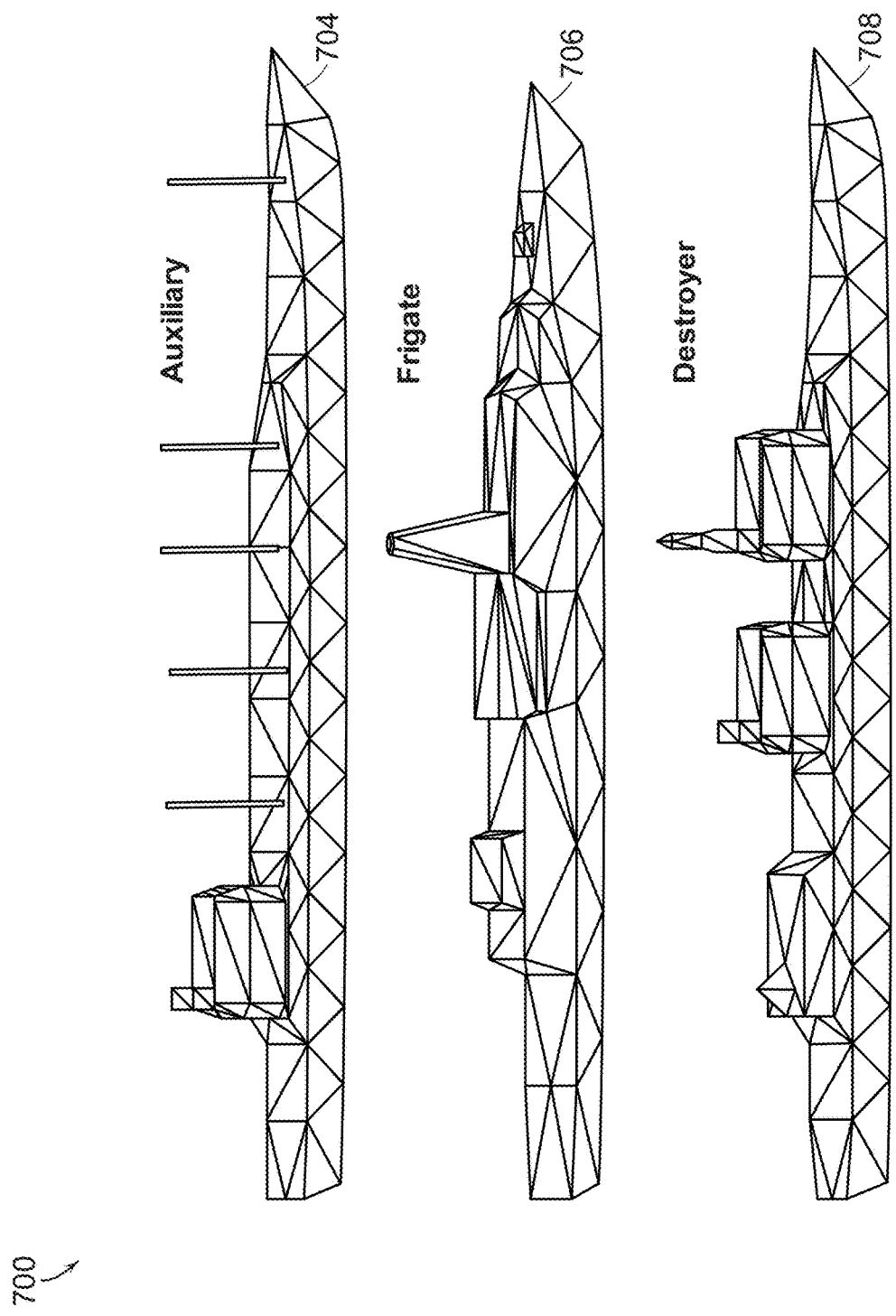
FIG. 7A shows an exemplary database of ship profiles including multiple Gross Naval Classes of naval vessels.
Figure 10:
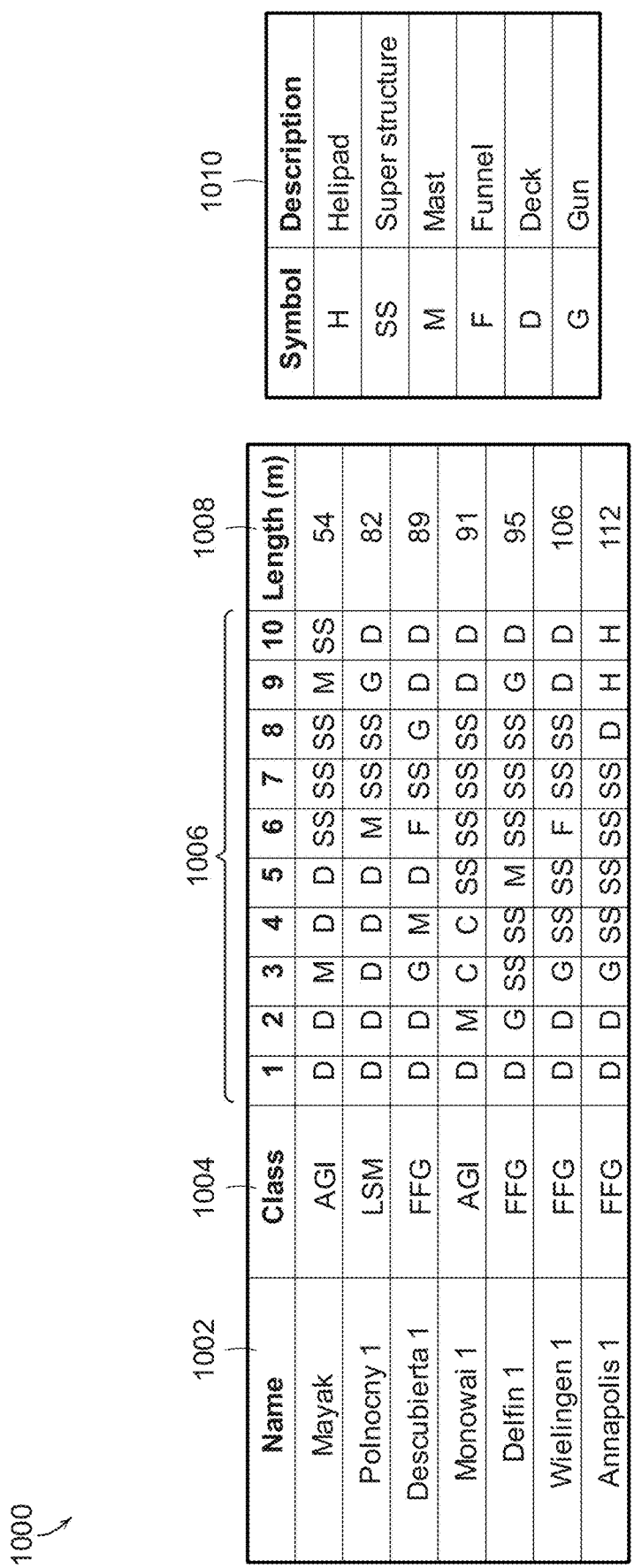
FIG. 10 is an exemplary database of major or predominant features organized in deciles along the LOA associated with multiple naval vessels including their classification.
Figure 11:
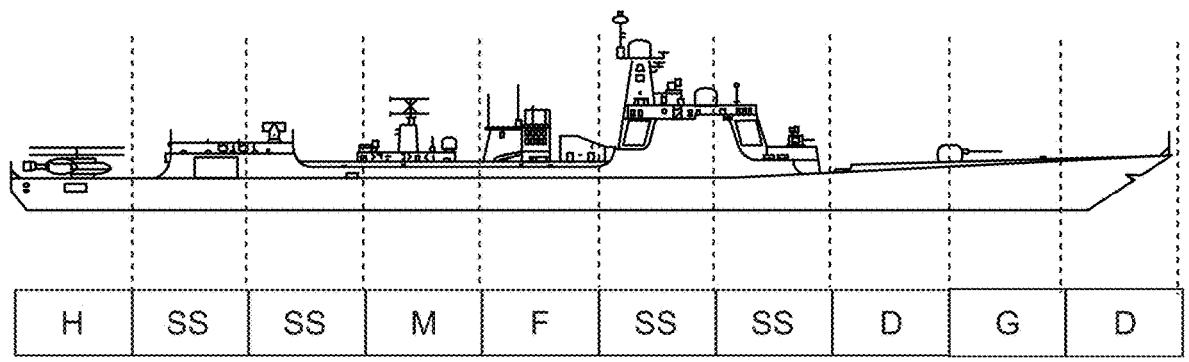
FIG. 11 is an exemplary diagram of a naval vessel that has been sectioned to into 10 equal length segments or deciles.

ATR database 306 may store target recognition data 700 including multiple reference features associated with each of multiple reference targets (e.g., ship classes). FIG. 7A illustrates a portion of data that may be stored in database 306 including target recognition data 700 related to various ship classes such as auxiliary 704, frigate 706, and destroyer 708. The data may be stored in a text format as illustrated by ship database entry 750 in FIG. 7B. These various ship classes 704, 706, and 708 are related by a fundamental gating feature in that all these classes have about the same LOA. Target recognition data of database 306 may include data such as illustrated in FIGS. 10 and 11 related to ship classes or types and locations of various features for ship classes. Table 1000 of FIG. 10 includes columns for name 1002, class 1004, ship sections or segments 1006, total length 1008 and a legend 1010 indicating a type of feature that may be located in a section of a ship. For example, a feature may include, without limitation, a heli-pad, super structure, mast, funnel, empty deck, and gun. FIG. 11 illustrates a segmentation of a reference destroyer into 10 sections including an indication of an expected predominant reference feature in each section of the reference destroyer. A predominant reference feature may be one that is recognized with higher probability or likelihood by the feature extractor and processor 312. Multiple reference features may also be included in each section. The data may be divided into more than 10 sections or represented as relative measurements from the bow, stern, or center of the ship over the LOA. The data may also be represented as a continuous or discrete (as in fuzzy logic) function of the probability or likelihood of the reference feature. Multiple reference features may also be combined to form a 2D heat map. The data may also be represented in the learned parameters of a neural network, whereby the neural network encodes one or more Pre-selector 308 states, designations, or determinations.

Figure 6:
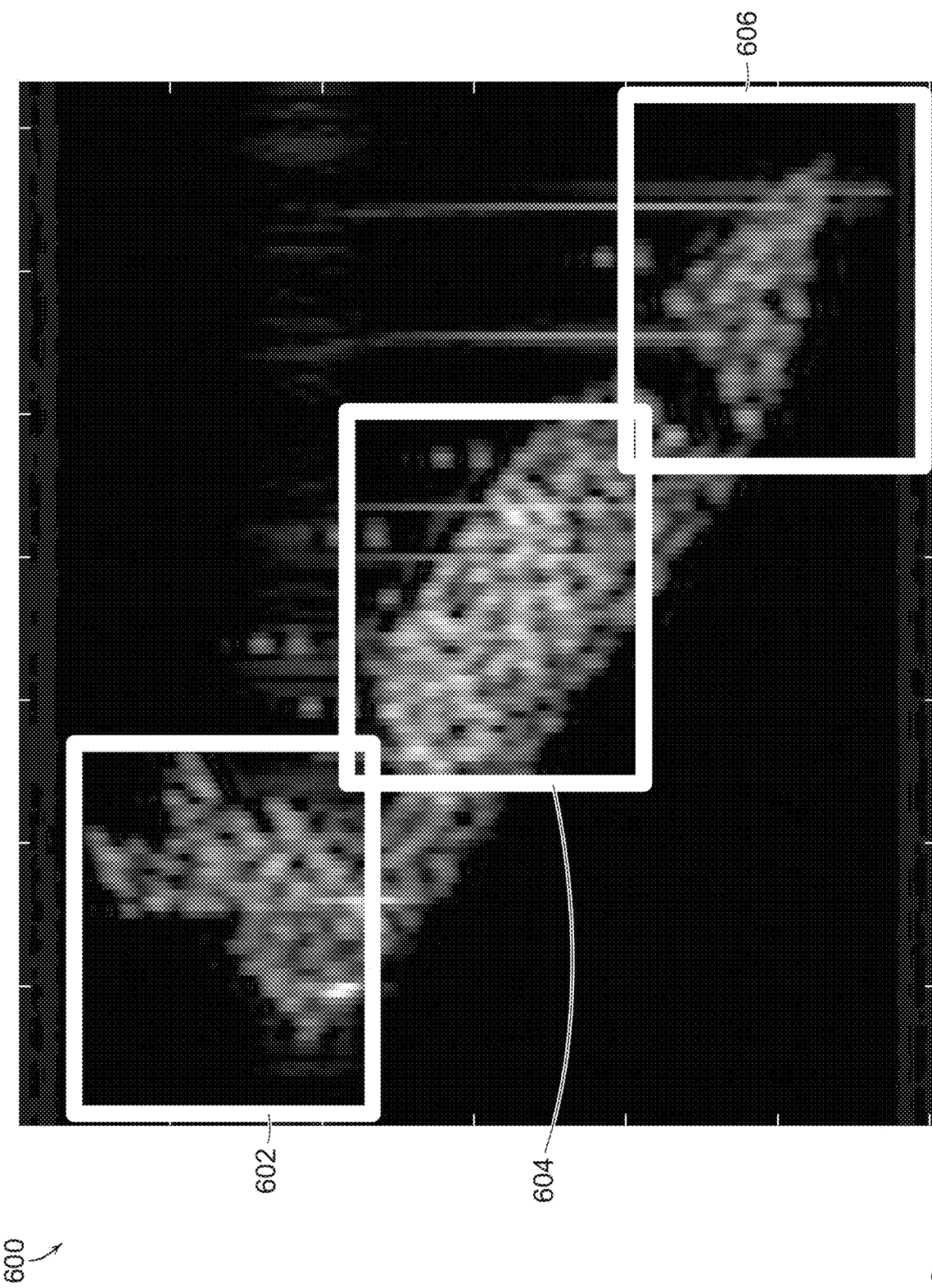
FIG. 6 shows the image of FIG. 4 including overlays designating three segments of the acquired naval vessel.

Feature extractor and processor 312 may be configured to compare and/or discriminate the acquired gating feature from preprocessor 310 with the reference gating feature selected by pre-selector 308 and, if there is a match, extract multiple segments from an acquired image such as image 400. A comparative match may be determined to have occurred when a difference in the LOA of the acquired vessel and the LOAs of the one or more reference vessels in database 306 are less than or equal to a pre-determined percentage difference. For example, less than or equal to one of 1%, 5%, 10%, 20%, 30%, 40%, and 50%. Pre-determined means that the Feature extractor and processor 312 has been programmed and/or configured with a percentage difference value and/or setting before the feature extractor and processor 312 initiates discrimination of an acquired gating feature. FIG. 6 shows image 400 with overlays indicating three extracted segments 602, 604, and 606. The number, size, and position of extracted segments may vary depending on discriminating features among multiple classes of ships being analyzed. As illustrated in FIGS. 10 and 11, feature extractor and processor 312 may chip up to 10 segments, or more, for feature discrimination depending on the ship classes being analyzed. The number of sections may include one of a discrete number of pre-determined sections. For example, one of 2, 3, 4, 5, 6, 7, 8, 9, and 10 sections, or more. Pre-determined means that the Feature extractor and processor 312 has been programmed and/or configured to use a discrete number of sections before the feature extractor and processor 312 initiates discrimination of an acquired gating feature. The feature extractor and processor 312 may correlate multiple segments associated with the acquired image 400 with a multiple sections of the one or more reference ships associated by the fundamental gating feature in database 306. Feature extractor and processor 312 may then discriminate the presence or absence of features associated with each of the multiple reference targets and/or ship classes in database 306. Feature extractor and processor 312 may use various techniques such as, without limitation, statistical methods, wavelet decomposition, normalized linear correlation, synthetic discrimination filter, or neural networks to detect and/or discriminate features in various segments of an acquired image such as image 400. Feature extractor and processor 312 may use various techniques to refocus and/or enhance image segments 602, 604, and 606, including super resolution methods that combine multiple images over time. Image enhancement may be for human visualization and/or machine interpretation.

Figure 14:
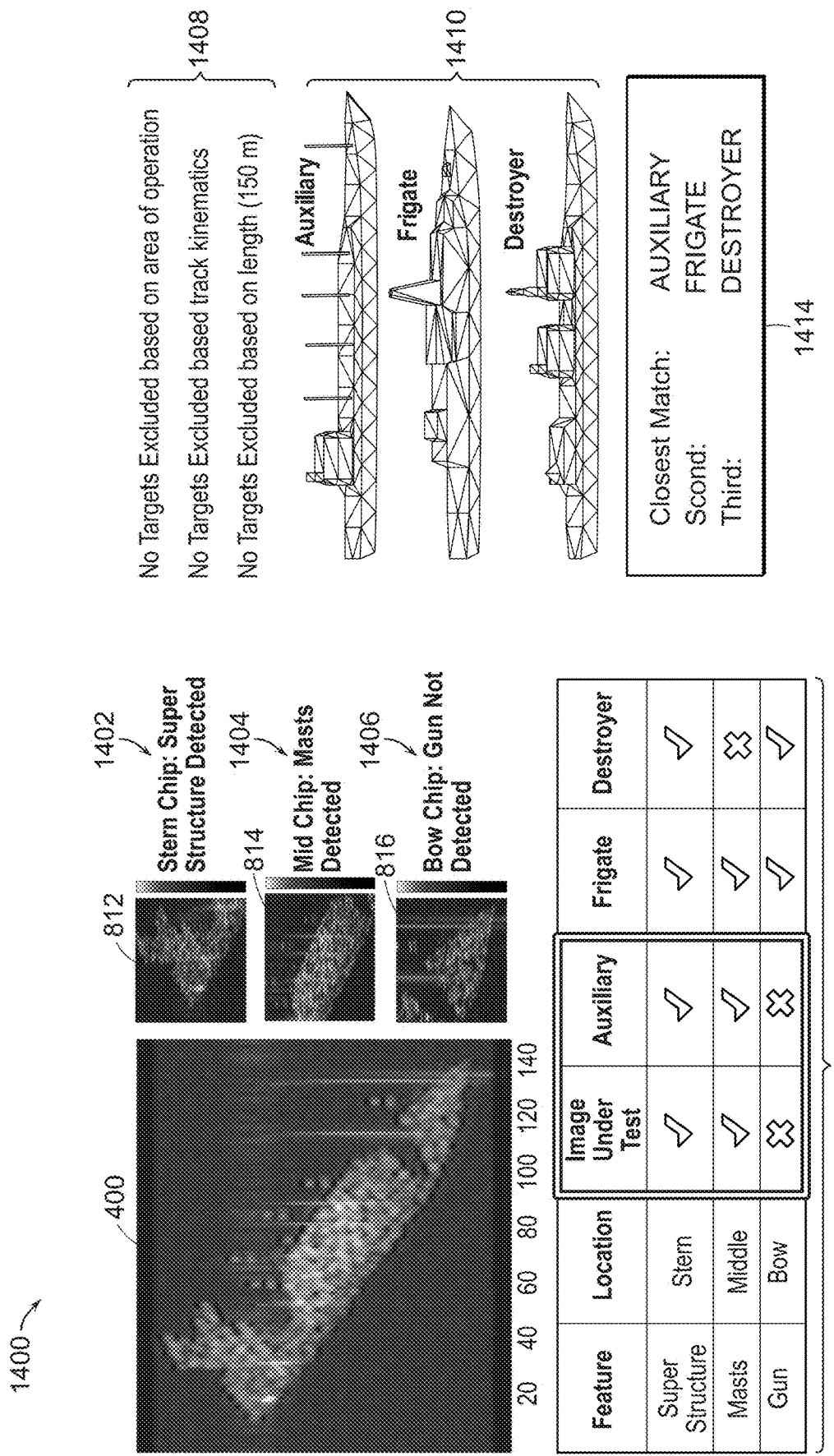
FIG. 14 is an exemplary classification report.

Classifier 314 may be configured to create multiple classification problems associated with the portion of the target recognition data based on the reference first gating feature. Classifier 314 may create multiple decision trees that solve the multiple classification problems. Classifier 314 may use Bayesian networks or directed acyclic graphs (DAG). Classifier 314 may select the decision tree having the minimal misclassification cost and determine a classification of the acquired target shown in image 400 based on the decision tree having the minimal misclassification cost. Classifier 400 may then generate a classification decision report, such as shown in FIG. 14, based on the determined classification of the acquired target in image 400. User interface 316 may be arranged to display the classification decision report to an operator.

Classifier 314 may use one or more neural networks, such multilayer perceptrons (MLPs), convolutional neural networks (CNNs), or deep Boltzman machines (DBM) that are trained to compute a function that maps an input vector or image to an output vector. The N-element output vector may convey estimates of the probabilities of N target classes and/or features. In some implementations, classifier 314 uses a recurrent neural network (RNN) where its neurons send feedback signals to each other to enable dynamic temporal behavior. Classifier 314 may use an enhanced RNN referred to as long short-term memory (LSTM) and/or hierarchal temporal memory (HTM). Classifier 314 may use fuzzy logic. Classifier 314 may combine multiple aforementioned algorithms to form a hybrid system. A decision tree is a generic term that describes a decision process that may use one or more attributes at each node and/or use an information theoretic measure to formulate queries at each node. It does not refer to a specific implementation, but may include one or a combination of ID3, C4.5, and/or CART.

The classification decision report, such as shown in FIG. 14, may include a graphical explanation of the determined classification of the acquired target such as shown in image 400. The classification report may include a graphical representation of the decision tree having the minimal misclassification cost as illustrated in decision tree 1300 of FIG. 13. The classification report may include the extracted features (e.g., image chips) or machine representations of those features, such as the activation values of a neural network hidden layer forming a mapping or manifold.

In some implementations, classifier 314 fuses a portion of reference features of the multiple reference features in database 306 to provide confidence metrics associated with a determined classification of an acquired target in image 400. ATR system 300 may use multiple gating features to refine the classification analysis process. In some implementations, pre-selector 308 selects a portion of the target recognition data in database 306 based additionally on a reference second gating feature. For example, if the first gating feature is LOA of a vessel, the second gating feature may be the location of the target vessel and/or area of operation of the target vessel. Feature extractor and processor 312 may additionally compare an acquired second gating feature (e.g., determined vessel location) with the reference second gating feature (e.g., area of operation). Classifier 314 may create the multiple classification problems based additionally on the acquired second gating feature.

Figure 4:
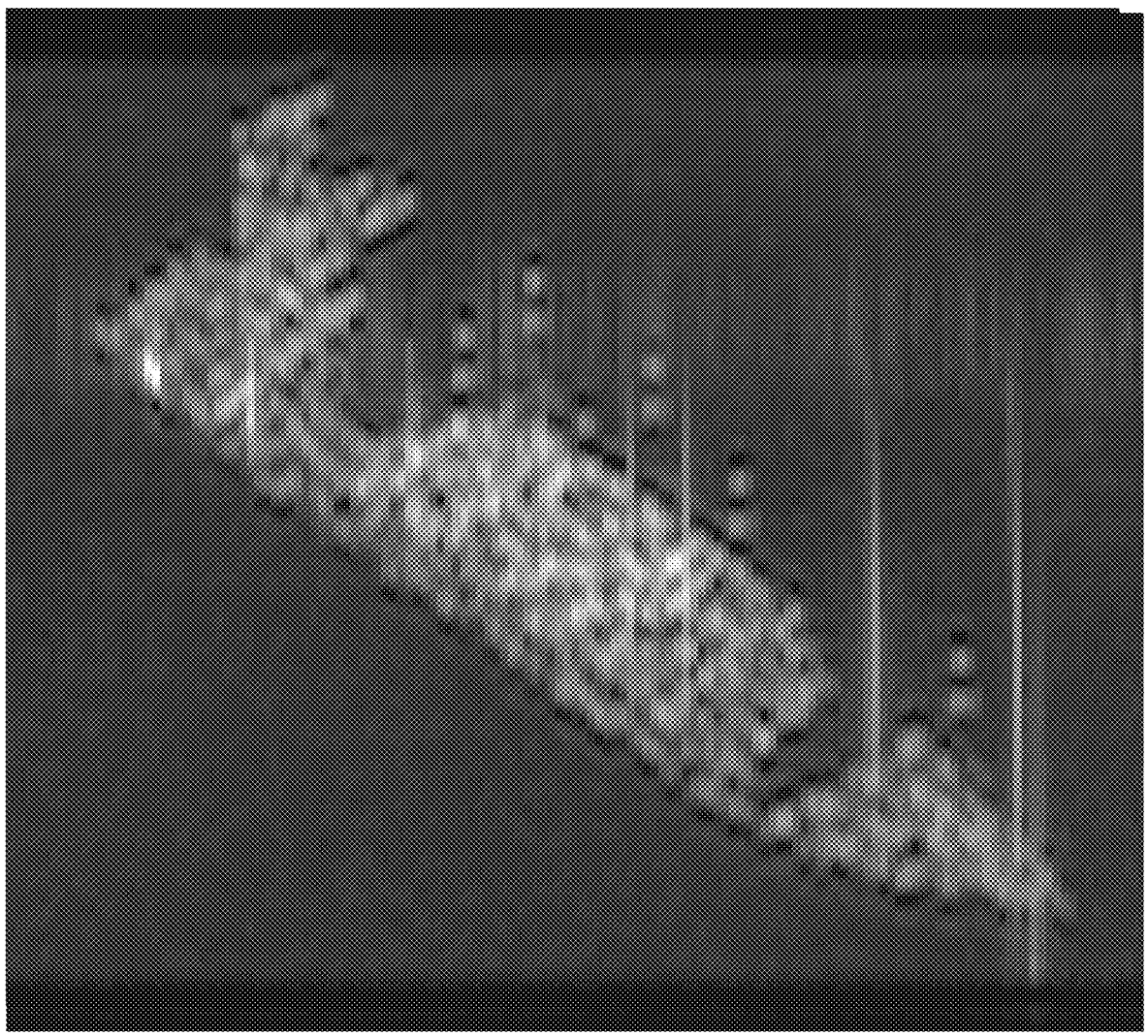
FIG. 4 is an exemplary plan view image of an acquired naval vessel using ISAR.
Figure 5:
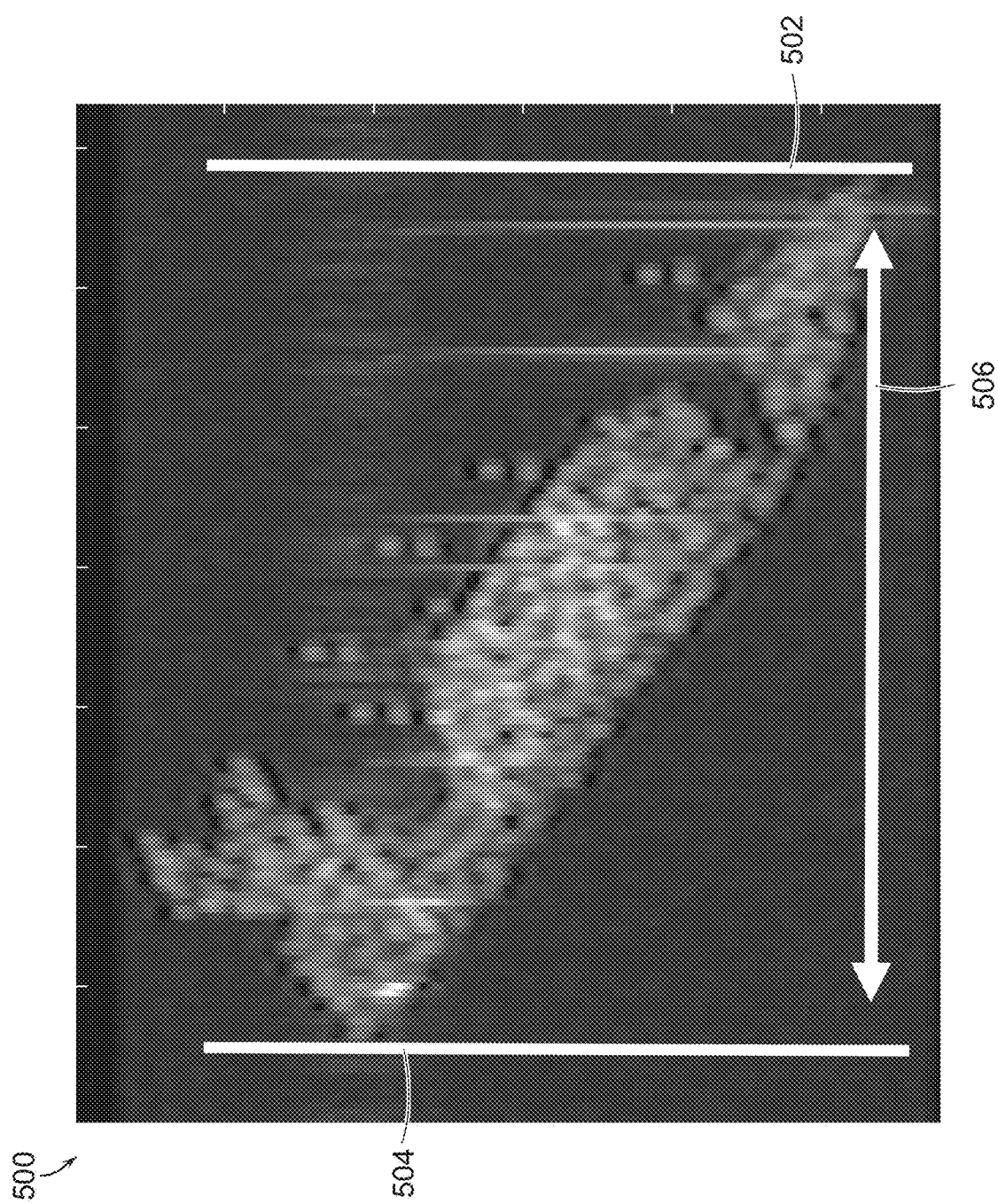
FIG. 5 shows the image of FIG. 4 including indicators associated with an acquired length of the naval vessel.
Figure 8:
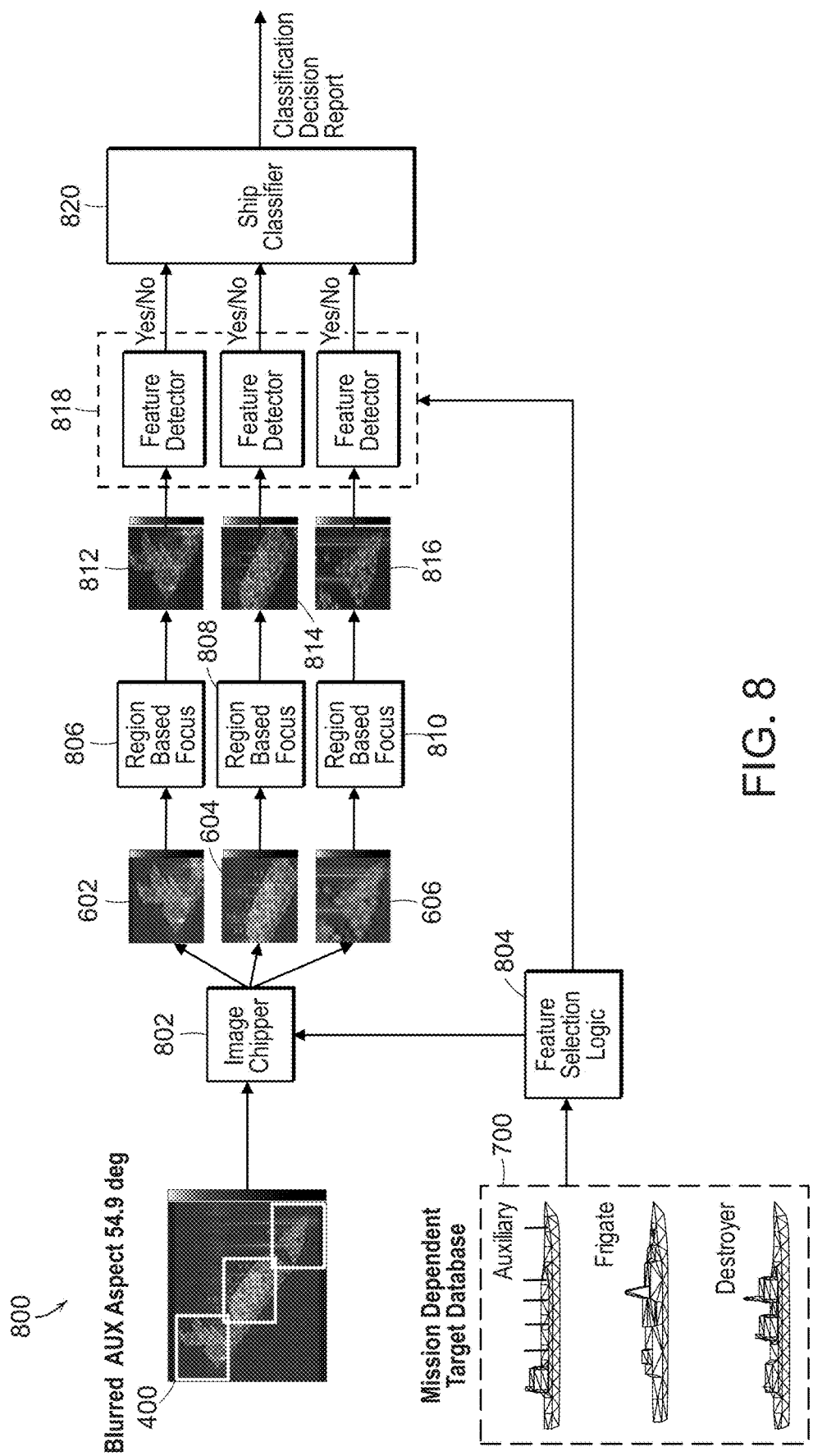
FIG. 8 is a functional diagram of an exemplary ATR system that processes the image of FIG. 4.

FIG. 8 is a functional diagram of an exemplary ATR system 800 that illustrates an implementation of ATR system 300 configured to process image 400 of FIG. 4. In operation, system 800 receives image 400 from an image acquisitions system such as unit 304. Image chipper 802, based on input from feature selection logic unit 804, selects segments 602, 604, and 606 of image 400 for feature extraction. Feature selection logic unit 804 may select segments 602, 604, and 606 based on known discriminating features among ship classes in the mission dependent target recognition data 700. In this instance, unit 804 selects three segments for extraction based on the ship classes listed in data 700.

In other instances involving other combinations of ship classes, feature selection logic unit 804 may select a different number of segments, different size segments, and/or segments at different positions along a ship's length, mission dependent target recognition data 700, information from the ATR database 306 and/or Pre-selector 308.

For example, to distinguish between an auxiliary and other classes, unit 804 may designate a first segment that includes the last 40 meters from the stern to detect a super structure, designate a second segment amidships to detect masts, and designate the first 20 meters from the bow to detect a gun. This may provide the most efficient set of segments to distinguish an auxiliary from a frigate and/or destroyer.

Region based focus elements 806, 808, and 810 may applying various image focusing, enhancing, and/or filtering techniques to image segments 602, 604, and 606 respectively to generate focused images 812, 814, and 816. Feature detector 818 may then apply one or more detection and/or discrimination techniques such as wavelet decomposition to make a binary yes/no decision of the absence or presence of a feature in each of the segment images 812, 814, and 816. In other implementations, feature extractor 818 may detect the type of feature in each segment with a probability or likelihood. In still other implementations, feature extractor 818 may generate a heat map of all test or candidate features for one or more segment images 812, 814, and 816 over the LOA. Feature extractor 818 may then provide its decision or probabilities associated with each of the focused images 812, 814, and 816 and their segments to ship classifier 820. Ship classifier 820 may implement feedforward neural networks such as CNNs to determine the classification of the vessel in image 400 and provide a classification decision report such as report 1400 of FIG. 14.

Figure 9:
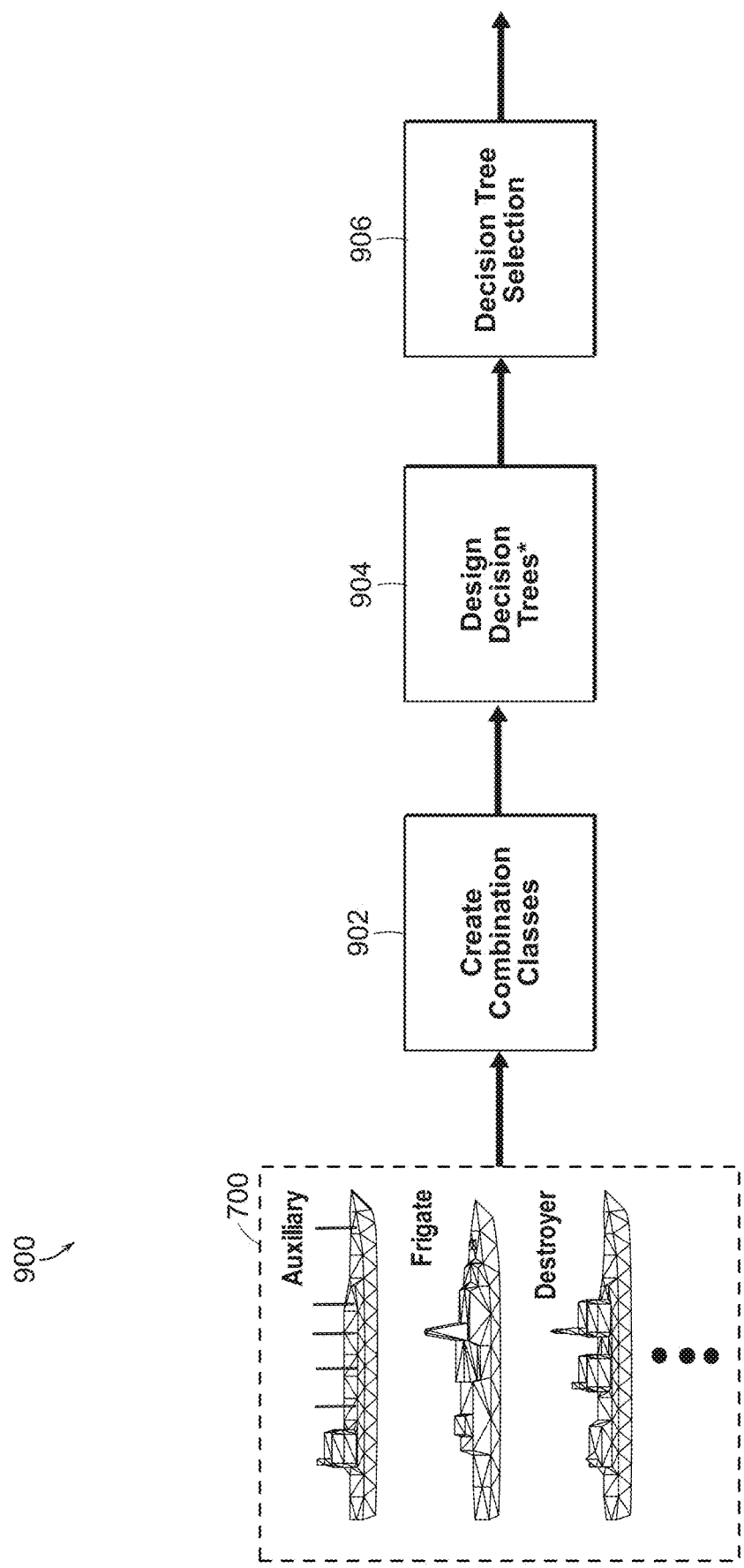
FIG. 9 is a diagram of a classification process performed by the classifier of FIG. 8.

FIG. 9 is a diagram of a classification process 900 performed by classifier 820. In some implementations, classifier 820 retrieves data 700 from database 306 and creates combination classes where a set of classification problems are designed such that some classification problems may contain classes that are a superset of the given mission dependent classes included in data 700. (Step 902). Classifier 820 may then create multiple decision trees that solve the plurality of classification problems. As previously discussed, a decision tree may refer more generally to a decision process that may use one or more attributes at each node and/or use an information theoretic measure to formulate queries at each node. It may not refer to a specific implementation such as ID3, C4.5, or CART but may use any one or combination of these implementations. (Step 904). Classifier 820 may further select the decision tree having the minimal misclassification cost and determine a classification of the acquired first target based on the decision tree having the minimal misclassification cost. (Step 906). Classifier 820 may generate a classification decision report based on the classification decision of the acquired first target.

FIG. 10 is an exemplary database of features associated with multiple naval vessels including their classification. As previously discussed, Table 1000 of FIG. 10 includes columns for name 1002, class 1004, ship sections or segments 1006, total length 1008 and a legend 1010 indicating a type of feature that may be located in a section of a ship. For example, a feature may include, without limitation, a helipad, super structure, mast, funnel, empty deck, and gun.

FIG. 11 illustrates a segmentation of a reference destroyer into 10 sections including an indication of an expected predominant reference feature in each section of the reference destroyer.

FIG. 12 shows an exemplary database 1200 comparing multiple target vessels with reference features associated with a reference Frigate ("FFG"). Database 1200 includes a list of multiple contact target vessels whose acquired features are compared to features associated with the reference FFG class. Column 1202 includes contact names that may be assigned to naval vessel contacts that are being tracked by an ATR system. Column 1204 includes a length associated with each vessel of column 1202. Columns 1206, 1208, 1210, 1212, and 1214 include indicators of whether a feature is present in a particular section and/or segment of a target vessel compared with the expected reference features of the reference FFG class. Column 1216 includes the class "FFG" which is associated with the reference features for an FFG shown in columns 1206-1214. Although not shown in color, each column may be filed with a color, e.g., green, when a feature is present while being clear, white, or "yellow" when a feature is absent. A column may include a symbol or number to indicate the presence or absence of a feature. In some implementations, a display and/or printout of database 1200, which may be included with a decision report provided to an operator, may be used to show the vessel under test and its extracted features to other ships in length order that are all of a single class (e.g., "FFG"). The "green" and "yellow" indicators may be used to indicate the database ships of that class that agree with the ship under test or that disagree. This may assist an operator by providing a quick color-based method to see how similar the ship under test is to the exemplars of a particular class.

For example, database 1200 shows that, for vessel contact Maestrale 1, all columns 1206, 1208, 1210, 1212 and 1214 are shaded (or colored "green") to indicate that all expected features of an FFG are present for Maestrale 1. Although not shown, an ATR system such as system 300 and/or 800 may perform additional comparisons of detected features of Maestrale 1 with other classes such as, for example, with expected features of a destroyer and auxiliary naval vessel, which may confirm that contact Maestrale 1 is an FFG. In this instance, a reference FFG is sectioned and/or segmented into five sections where column 1202 corresponds to a bow gun, column 1204 corresponds to a stern helipad, column 1206 corresponds to a super structure in a portion amidships, column ×4 corresponds to a super structure in another portion amidships, and column ×5 corresponds to a super structure in yet another portion amidships.

Figure 13:
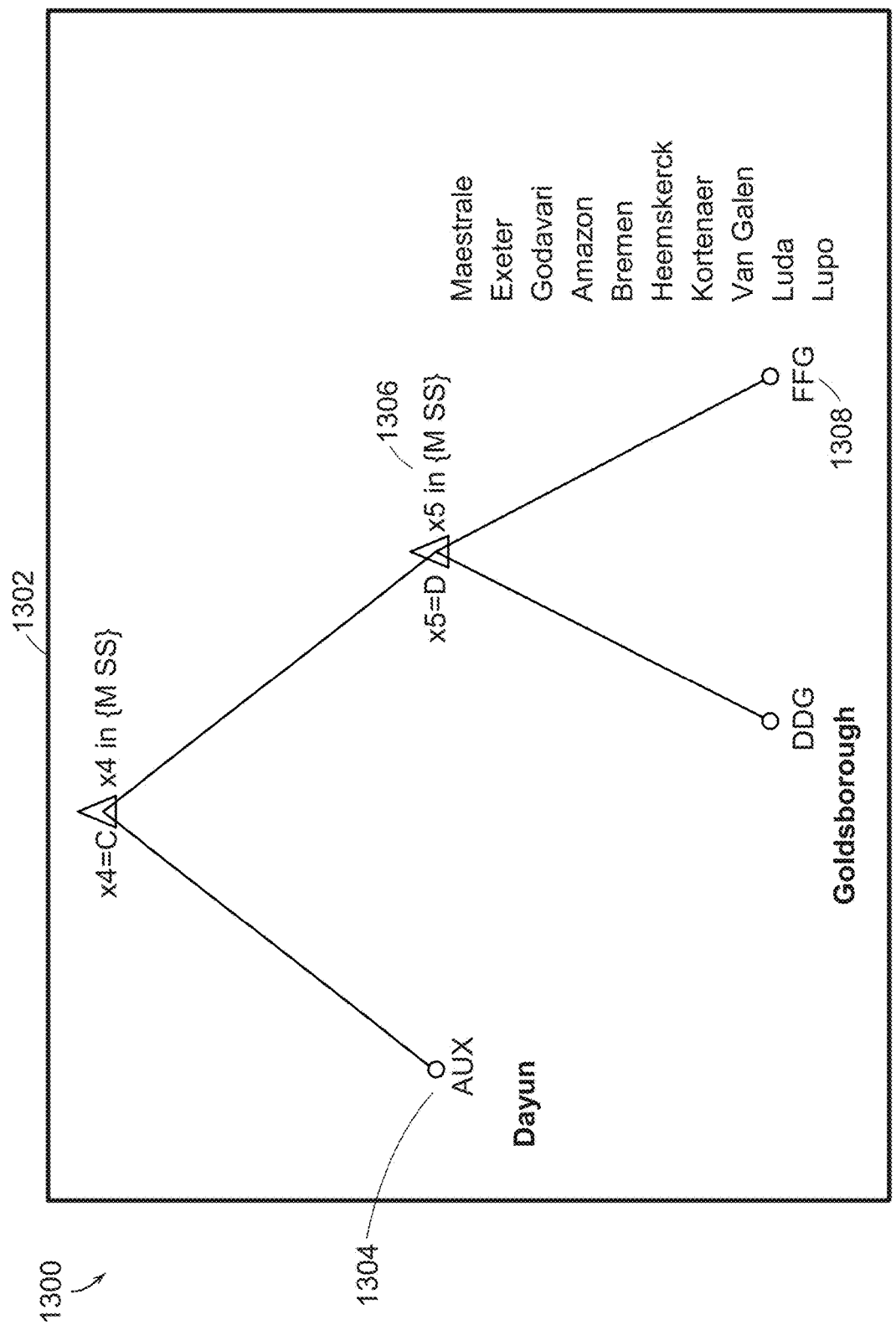
FIG. 13 is an exemplary representation of the decision process performed by a decision tree of an ATR.

FIG. 13 is an exemplary representation of the decision process performed using a decision tree 1300 by an ATR system such as ATR system 300 and/or 800. Classifier 820, when classifying Maestrale 1 of FIG. 12, may initially determine what type of acquired feature is present in segment ×4 at tree node 1302. If a crane "C" is detected, classifier 820 would move to the left child node 1304 labeled "AUX" and determine that Maestrale 1 is an auxiliary. But, if a mast and/or super structure is detected in section ×4, then classifier 820 moves to child node 1306 to continue the decision process. In decision tree 1300, classifier 820 determines that a mast and/or super structure is present in section ×4 and, therefore, moves to node 1306. At node 1306, classifier 820 checks whether section ×5 has an empty deck "D" or mast and/or super structure "M SS" present. In this case, a "M SS" is detected in section ×5 and, therefore, classifier 820 moves to node 1308 and determines that Maestrale 1 is a FFG.

In some implementations, classifier 820 determines that decision tree 1300 is the decision tree having the minimal misclassification cost. The initial test of whether a C or M SS is present at section ×4 may not be arbitrary. Instead, classifier 820 creates multiple decisions trees but determines that decision tree 1300 is the most efficient decision process.

In some implementations, classifier 820 determines that an initial test at section ×4 that enables a follow up test of section ×5 is the most efficient decision process to classify a target vessel having a particular fundamental gating feature, e.g., length of 120 meters. Decision tree 1300 may advantageously include the most shallow and understandable decision tree to enable an operator to more readily understand and/or be able to explain the decision process. A graphical representation of decision tree 1300 may be included in a classification report provided to a user interface to display to an operator.

FIG. 14 includes an exemplary classification report 1400 based on a classification decision for the target vessel in image 400. The report 1400 includes image 400 and chips 812, 814, and 816 corresponding to displayed decisions 1402, 1404, and 1406 of the presence or absence of a feature in each chip, section, and/or segment associated with image 400. The report 1400 may include an indicator 1408 of one or more gating features used to perform the classification decision. The report 1400 may include one or more graphical images of the reference vessel classes used by classifier 820 to generate the report 1400. The report 1400 may include a table 1412 that provides a readily understandable comparison of sections of image 400 with respect to sections of reference vessel classes such as an auxiliary, frigate, and destroyer. Report 1400 may include a decision indicator 1414 that indicates a closest match of the vessel in image 400 with multiple possible reference classes. In this instance, the closet match is determined to be an auxiliary. Report 1400 may include one, some, or all of the indicators shown in FIG. 14. Report 1400 may include other indicators such as a graphical image of decision tree 1300 or other indicators that may enhance the explainability of a decision.

Figure 15:
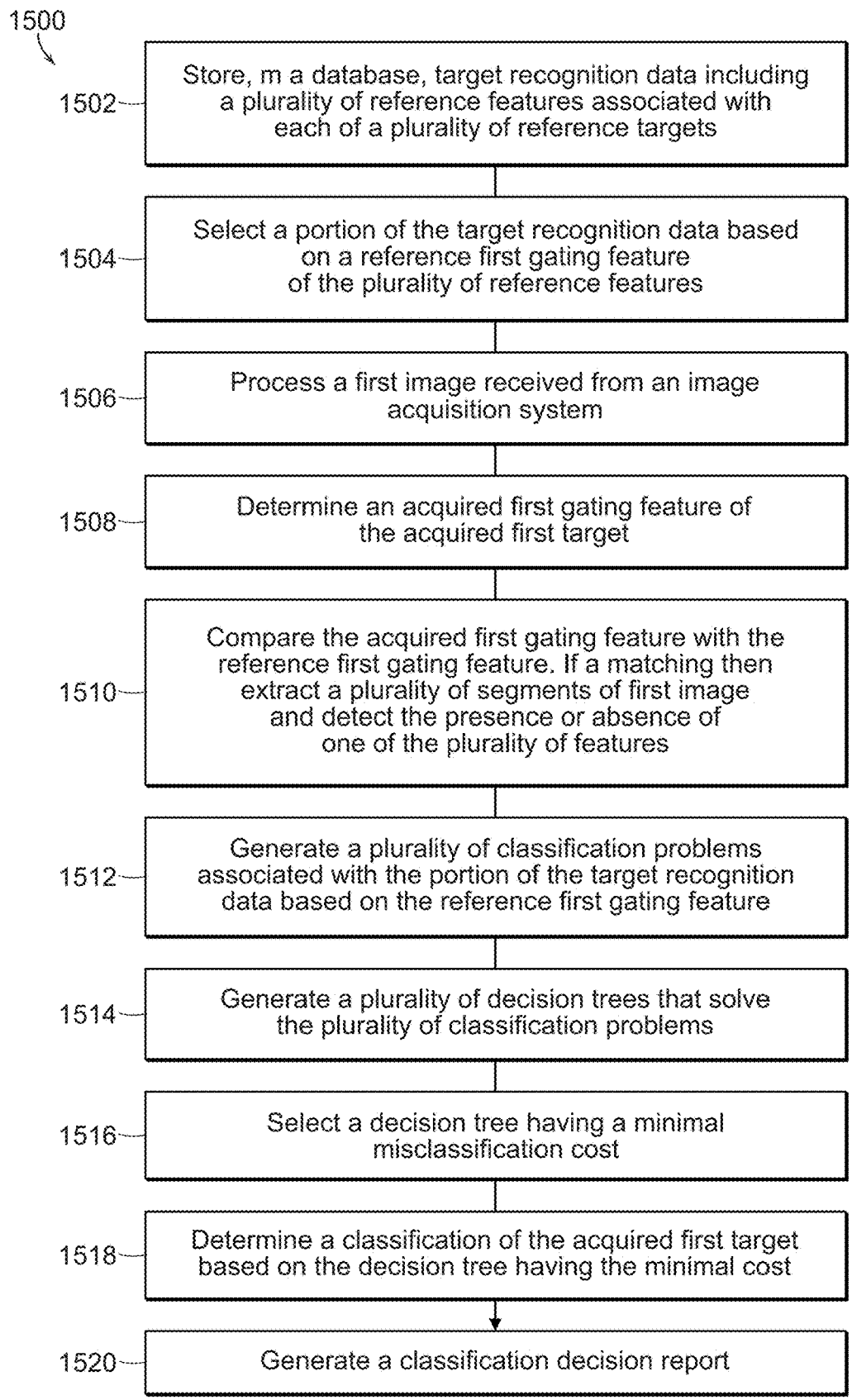
FIG. 15 is an exemplary process for performing automatic target recognition.

FIG. 15 is an exemplary process 1500 for performing automatic target recognition including: storing, in a database such as database 306, target recognition data including a plurality of reference features associated with each of a plurality of reference targets (Step 1502); selecting a portion of the target recognition data based on a reference first gating feature of the plurality of reference features (Step 1504); processing a first image such as image 400 received from an image acquisition system, wherein the first image is associated with an acquired first target (Step 1506); determining an acquired first gating feature of the acquired first target (Step 1508); discriminating the acquired first gating feature with the reference first gating feature and, if there is a match, i) extracting a plurality of segments of the first image, and ii) detecting one of the presence, absence, probability or likelihood of one of the plurality of features associated with each of the plurality of reference targets (Step 1510); generating a plurality of classification problems associated with the portion of the target recognition data based on the reference first gating feature (Step 1512); generating a plurality of decision trees that solve the plurality of classification problems (Step 1514); selecting a decision tree having the minimal misclassification cost (Step 1516); determining a classification of the acquired first target based on the decision tree having the minimal misclassification cost (Step 1518); and generating a classification decision report based on the determined classification of the acquired first target (Step 1520).

It will be apparent to those of ordinary skill in the art that certain aspects involved in the operation of the system 200, server 302, system 800 and other servers or devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. An automatic target recognizer system comprising:
   a memory arranged to store target recognition data including a plurality of reference features associated with each of a plurality of reference targets;
   a processor arranged to:
   i) select a portion of the target recognition data based on a reference first gating feature of the plurality of reference features;
   ii) process a first image received from an image acquisition system, the first image being associated with an acquired first target, wherein the preprocessor determines an acquired first gating feature of the acquired first target;
   iii) discriminate the acquired first gating feature with the reference first gating feature and, if there is a match, extract a plurality of segments of the first image;
   iv) detect one of the presence, absence, probability or likelihood of one of the plurality of features associated with each of the plurality of reference targets;
   v) create a plurality of classification problems associated with the portion of the target recognition data based on the reference first gating feature;
   vi) create a plurality of decision trees that solve the plurality of classification problems;
   vii) select the decision tree having the minimal misclassification cost, iv) determine a classification of the acquired first target based on the decision tree having the minimal misclassification cost: and
   viii) generate a classification decision report based on the determined classification of the acquired first target; and
   a display arranged to display the classification decision report.

2. The system of claim 1, wherein the first gating feature includes one of target length overall, target state, target kinematics, target location, and mission context.

3. The system of claim 2, wherein the reference first gating feature includes lengths overall of one or more reference vessels and the acquired first gating feature includes a length overall of an acquired vessel, wherein the processor determines the length of the acquired vessel by processing the first image.

4. The system of claim 3, wherein the processor determines that a match has occurred when a difference in the length overall of the acquired vessel and the lengths of the one or more reference vessels are less than or equal to a pre-determined percentage difference.

5. The system of claim 4, wherein the processor discriminates the plurality of segments associated with the acquired vessel with a plurality of sections of the one or more reference vessels.

6. The system of claim 5, wherein the plurality of sections includes one of a discrete number of pre-determined sections.

7. The system of claim 1, wherein the processor enhances an image associated with each of the extracted segments of the first image.

8. The system of claim 1, wherein the first image is generated based on at least one of synthetic aperture radar (SAR), inverse synthetic aperture radar (ISAR), laser detection and ranging (LADAR), infrared detection, optical based imagery, and hyperspectral radar data.

9. The system of claim 1, wherein the classification decision report includes a graphical explanation of the determined classification of the acquired first target.

10. The system of claim 9, wherein the classification report includes a graphical representation of the decision tree having the minimal misclassification cost.

11. The system of claim 1, wherein the processor fuses a portion of the reference features of the plurality of reference features to provide confidence metrics associated with the determined classification of the acquired first target.

12. The system of claim 1, wherein:
the processor is arranged to select the portion of the target recognition data based further on a reference second gating feature of the plurality of reference features;
the processor further compares an acquired second gating feature with the reference second gating feature; and
the processor creates the plurality of classification problems based further on the acquired second gating feature.

13. An automatic target recognizer server comprising:
a data communications device arranged to: i) receive first image data associated with a first image from an image acquisition system and ii) arranged to receive, from a memory, target recognition data including a plurality of reference features associated with each of a plurality of reference targets;
a processor arranged to:
i) select a portion of the target recognition data based on a reference first gating feature of the plurality of reference features;
ii) process a first image received from an image acquisition system, the first image being associated with an acquired first target, wherein the processor determines an acquired first gating feature of the acquired first target;
iii) discriminate the acquired first gating feature with the reference first gating feature and, if there is a match, extract a plurality of segments of the first image;
iv) detect one of the presence, absence, probability or likelihood of one of the plurality of features associated with each of the plurality of reference targets;
v) create a plurality of classification problems associated with the portion of the target recognition data based on the reference first gating feature;
vi) create a plurality of decision trees that solve the plurality of classification problems;
vii) select the decision tree having the minimal misclassification cost; viii) determine a classification of the acquired first target based on the decision tree having the minimal misclassification cost;
ix) generate a classification decision report based on the determined classification of the acquired first target; and
a display arranged to display the classification decision report.

14. The server of claim 13, wherein the first gating feature includes one of target length, target state, target kinematics, target location, and mission context.

15. The server of claim 14, wherein the reference first gating feature includes lengths overall of one or more reference vessels and the acquired first gating feature includes a length overall of an acquired vessel, wherein the processor determines the length overall of the acquired vessel by processing the first image.

16. The server of claim 15, wherein the processor determines that a match has occurred when a difference in the length overall of the acquired vessel and the lengths overall of the one or more reference vessels are less than or equal to a pre-determined percentage difference.

17. The server of claim 16, wherein the processor discriminates the plurality of segments associated with the acquired vessel with a plurality of sections of the one or more reference vessels.

18. The server of claim 13, wherein the classification decision report includes a graphical explanation of the determined classification of the acquired first target.

19. The server of claim 18, wherein the classification report includes a graphical representation of the decision tree having the minimal misclassification cost.

20. A method of performing automatic target recognition comprising:
storing, in a memory, target recognition data including a plurality of reference features associated with each of a plurality of reference targets;
selecting a portion of the target recognition data based on a reference first gating feature of the plurality of reference features;
processing a first image received from an image acquisition system, wherein the first image is associated with an acquired first target;
determining an acquired first gating feature of the acquired first target;
discriminating the acquired first gating feature with the reference first gating feature and, if there is a match, i) extracting a plurality of segments of the first image, and ii) detecting one of the presence, and absence, probability or likelihood of one of the plurality of features associated with each of the plurality of reference targets;
generating a plurality of classification problems associated with the portion of the target recognition data based on the reference first gating feature;
generating a plurality of decision trees that solve the plurality of classification problems;
selecting a decision tree having the minimal misclassification cost;
determining a classification of the acquired first target based on the decision tree having the minimal misclassification cost; and
generating a classification decision report based on the determined classification of the acquired first target.

* * * * *